June 27, 1961
L. P. SHILDNECK
2,990,483
HIGH NATURAL FREQUENCY AIR SHIELD FOR
A DYNAMOELECTRIC MACHINE
Filed Feb. 11, 1960
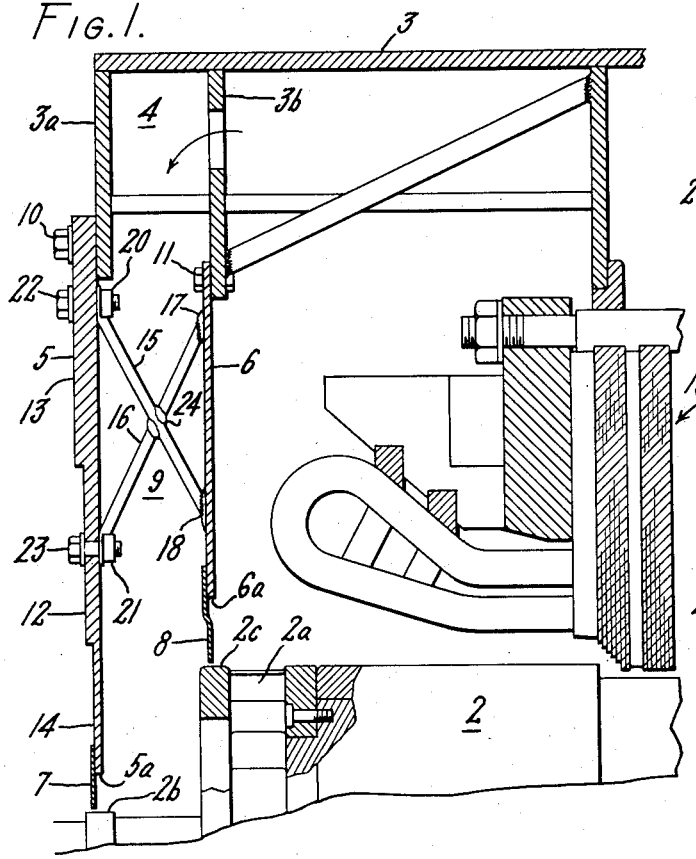
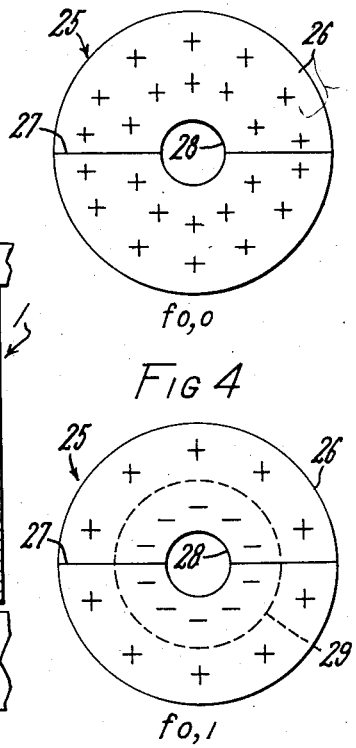
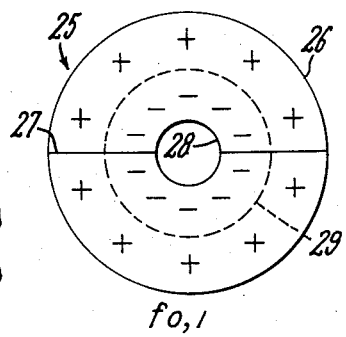
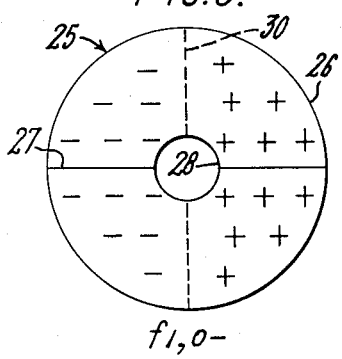
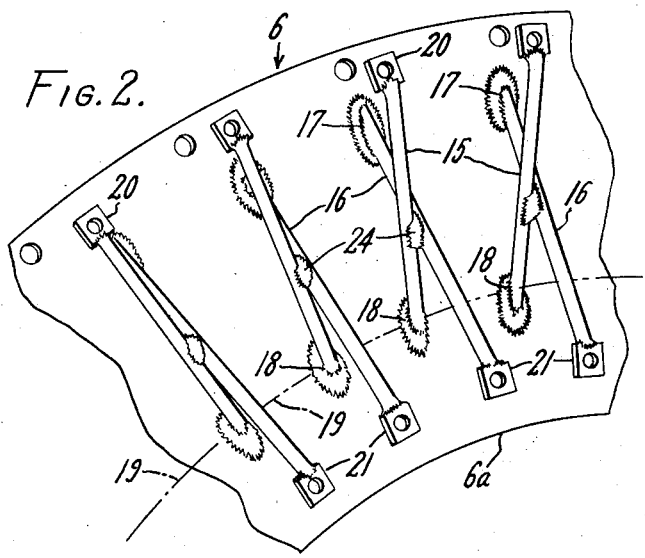
INVENTOR
LLOYD P. SHILDNECK
BY W. C. Crutcher
HIS ATTORNEY

United States Patent Office

2,990,483
Patented June 27, 1961

2,990,483
HIGH NATURAL FREQUENCY AIR SHIELD
FOR A DYNAMOELECTRIC MACHINE
Lloyd P. Shildneck, Marblehead, Mass., assignor to General Electric Company, a corporation of New York
Filed Feb. 11, 1960, Ser. No. 8,174
8 Claims. (Cl. 310—64)

This invention relates to a rigid duct assembly for conducting a coolant fluid in a rotary machine, such as a dynamoelectric machine, which is not resonant with the vibration of the machine, and more particularly it relates to an "air shield" with a high natural frequency of vibration for use as part of the casing end assembly of a turbine-generator.

Modern high-speed turbine-generators are designed to be smooth running, quiet, and free from excessive or annoying vibration. One important consideration towards achieving this goal is the natural frequency of different structural parts of the generator. It is important to design all structural parts so that their natural frequencies will not lie close to the "forcing" frequencies of the machine when it is operating in its designed speed range. Specifically, these "forcing" frequencies in a two-pole 3600 r.p.m. generator include the 60 cycles per second (c.p.s.) shaft vibration of the rotor and the 120 c.p.s. vibration caused by the rotating magnetic field in the stator. Control of the structural natural frequencies is desirable to prevent excessive vibration due to resonance of the various structural parts with the "forcing" frequency. One of the more troublesome sources of vibration, from the standpoint of designing for natural frequency, is the "air shield," which forms part of the generator casing end wall assembly defining part of the flow path for the cooling gas.

Such air shields for gas-cooled turbine-generators are usually large, flat, circular steel plates which close the ends of the stator casing and direct the flow of cooling air radially inward into the coolant circulating fans. The plate has a hole in the center for the generator rotor and is usually split along a centerline so that it can be removed or assembled easily.

Although it is commonly understood that increasing the thickness of material in any structure will usually raise its natural frequency, this expedient is undesirable in a generator air shield due to weihgt and size limitations, and is of course also wasteful of material. Also, bracing the shield from a more rigid structure will often raise the natural frequency of a part; but the peculiar configuration of a generator air shield makes this difficult to accomplish without obstructing the flow of cooling gas. The most convenient method for attaching the annular air shield assembly to the casing is by bolting the outer periphery of the air shields to the stator casing with a ring of bolts. A further consideration is that the inner peripheral edge defining the central hole in the air shield must be left relatively unobstructed, since this edge forms close clearances with the rotor to prevent leakage of the coolant.

Accordingly, one object of the present invention is to provide an improved rigid annular duct assembly with a high natural frequency of vibration.

Another object is to provide an improved generator "air-shield" with a high natural frequency of vibration for conducting a radial flow of coolant gas to the fan of an air-cooled generator.

Still another object is to provide an improved configuration for an annular duct assembly, where the duct is defined between two disks which are supported only at their outer peripheries.

Another object is to provide an improved bracing arrangement for increasing the natural frequency of vibration between two spaced disks, including an important discovery relating to the placement of the braces.

Generally stated, the invention is practiced by providing a plurality of relatively slender columnar bracing members which run from the outer periphery of one shield to an intermediate portion of another shield and from the outer periphery of the second shield to an intermediate portion of the first shield, thus forming a number of X-shaped braces, which are also rigidly connected at the intersection. The effectiveness of the arrangement is greatly enhance by varying the thickness of one or both of the air-shield disks so that they decrease in axial thickness toward the center in graduated steps and by attaching the rod braces at the intermediate portion of the shield along what would be a nodal circle if the disk were vibrating alone.

The features of the invention which are believed to be novel are set forth with particularity in the claims appended hereto. The invention itself, however, both as to its organization and method of operation together with further objects and advantages thereof, may best be understood by reference to the following description taken in connection with the accompanying drawing in which:

FIG. 1 is an elevation drawing, partly in section, of the end portion of the top half of a turbine-generator showing parts of the rotor and stator together with the outer casing wrapper and the air shield;

FIG. 2 is an enlarged perspective detail drawing of the inner air shield illustrating more clearly the placement of the bracing members; and FIGS. 3–5 are schematic representations of various modes of vibration of a disk supported at its periphery.

Referring now to FIG. 1 of the drawing, a generator stator, shown generally at 1, has a central bore within which turns a generator rotor 2 supported by bearings (not shown). A portion of the outer casing wrapper 3 includes axially spaced radial walls 3a, 3b which define between them an annular coolant supply chamber 4. The details for furnishing a supply of cool air to chamber 4 are immaterial to the present invention, it only being necessary to understand that the air is circulated throughout the rotor and the stator to cool the windings, after which it is cooled and then recirculated to chamber 4. Another supply chamber similar to chamber 4 may also be disposed at the opposite end of the generator. The cooling air is drawn radially inward by centrifugal fan blades 2a disposed on the rotor 2. Attached to the annular walls 3a, 3b respectively are an outer air shield 5 and an inner air shield 6. Outer and inner air shields 5, 6 are large annular steel plates which define central circular holes 5a, 6a respectively which enclose the rotor 2. Annular sealing members 7, 8 are attached to the inner peripheries of the air shield members 5, 6 respectively and the sealing members 7, 8 form close clearances with machined surfaces 2b, 2c of the rotor, in order to prevent the leakage of the cooling air axially along the rotor. The outer and inner air shields 5, 6 define between them an annular cooling duct 9 which conducts cooling air from supply chamber 4 inward under the action of fan blades 2a. A ring of circumferentially spaced bolts, one of which is seen at 10, secures the outer periphery of the outer air shield 5 to the annular wall 3a. Similarly, a ring of bolts, one of which is seen at 11, secures the outer periphery of the inner air shield 6 to the radial casing wall 3b. The construction thus far is conventional and the outer and inner air shields 5, 6 if unsupported would have modes of natural vibration which might take many forms. The different modes follow the rules for vibration of a circular disk with a hole in the center and the nodal lines may lie along one or more diameters of the disk or may lie along a circle taken from the axis of the disk and having a diameter intermediate that of the hole in the disk and the outer periphery of the disk.

Examination of the outer air shield 5 will reveal it to be composed of graduated axial thicknesses which decrease from the outside to the inside of the air shield. It was discovered during work on the air shield that the frequency in one mode of vibration could be raised appreciably by constructing the outer air shield 5 in this manner, with a substantial saving in weight. Thus, instead of constructing the entire air shield 5 of an average thickness as illustrated by the center portion 12 of air shield 5, which thickness may be on the order of ⅜ inch for a shield having an outside diameter on the order of 54 inches, the radially outermost portion illustrated at 13 is fabricated of greater than average thickness (on the order of ⅝ inch) and the radially innermost portion 14 is constructed of a less than average thickness (on the order of ⅛ inch).

The unique bracing arrangement which results in a substantial increase in the natural frequency of shield members 5, 6 comprises a first group of diagonal braces, one of which is seen as 15 in FIG. 1 and a second group of diagonal braces, one of which is seen as 16 in FIG. 1.

Reference to FIG. 2 of the drawing will illustrate more clearly the placement of bracing members 15, 16. Here the perspective view of inner air shield 6 illustrates that the diagonal braces 15, 16 are circumferentially spaced in pairs forming an X disposition, each X lying substantially in a plane with the generator axis. One end of each rod 16 is welded or otherwise suitably secured near the outer periphery of air shield 6 as illustrated at 17. Similarly, one end of each bracing member 15 is secured to disk 6 along a circle coaxial with the air shield as illustrated at 18. The circle along which members 15 are secured to inner air shield 6 is shown at 19 and is preferably a "nodal circle" of a higher frequency mode than that sought to be removed, as more fully explained hereinafter. The free ends of bracing members 15, 16 have nuts 20, 21 respectively, welded to them. This provides a convenient means for securing the air shield 6 to the outer air shield 5 by bolts 22, 23 as seen in FIG. 1.

It will be observed from FIG. 2 that bracing members 15, 16 are relatively slender as compared to the size of air shield 6 and are rounded in order to not impede the flow of air through the duct 9. Since members 15, 16 receive the loading primarily in tension and compression, they are preferably columnar or of a cross-section suitable for a "column," i.e. having a large radius of gyration. A very satisfactory result was obtained with a nominal ⅛ inch pipe which has an outside diameter of close to ⅜ inch, or roughly the same as the average thickness of the air shield 5. The ⅛ inch pipe is relatively inexpensive and provides a good columnar member with rounded surface to provide the least obstruction to air flow. It will be observed that the bracing members 15, 16 are rigidly connected at their intersections, as by welding at 24.

Thus it will be seen that members 15 connect the rigid portion of outer air shield 5 with the inner unsupported portion of air shield 6. Similarly, members 16 connect the relatively rigid portion of inner air shield 6 with the inner unsupported portion of outer air shield 5.

Without the use of bracing members 15, 16, the outer and inner air shields 5, 6 would vibrate in accordance with the rules for a disk with a hole in the center and supported at its outer periphery. FIGS. 3 and 4 and 5 illustrate diagrammatically only a few of the many modes of vibration which such a disk will take. The "+" signs represent a displacement of the disk surface out of the plane of the drawing and the "−" signs represent a displacement into the plane of the drawing if the motion of the disk is "stopped" or viewed instantaneously for purposes of analysis.

In FIG. 3, the disk 25 is considered to be supported around its outer periphery 26, is divided into two portions along a diameter 27, and defines a hole 28 in the center. The disk in FIG. 3 is shown vibrating in the "$f_{0,0}$" or "fundamental" mode. There are no nodes in this mode, the only location of no amplitude being the supported peripheral edge 26.

FIG. 4 illustrates vibration in the "$f_{0,1}$" mode. Here the disk 25 vibrates with a "nodal circle" of no displacement at 29. Higher frequency modes exist, with two or more nodal circles concentric with the disk axis.

Vibration in the "$f_{1,0-}$" mode is illustrated in FIG. 5. Here the nodal line 30 lies along a diameter of the disk with the displacement of the disk surface alternating in opposite directions on either side of nodal line 30. Higher frequency modes exist with nodal lines lying along two or more diameters or along the dividing line 27, or both, but the modes illustrated in FIGS. 4 and 5 will illustrate the two basic types of vibratory movement above the fundamental mode.

With the foregoing explanation in mind, the operation of my improved braced air shield assembly will be explained. The bracing members 15, 16 connect the unsupported portions of one air shield with the supported portions of the other air shield in a unique manner which offers the least resistance to a radial gas flow, due to the diagonal disposition of the braces and due to their slenderness. Any movement of the radially inner portion of air shield 6 is communicated axially along the columnar bracing member 15 to the rigid portion of outer air shield 5 and any movement of the inner unsupported portion of air shield 5 is communicated axially along the slender columnar bracing member 16 to the relatively rigid portion of inner air shield 6. The bracing members 15, 16 thus serve to provide an effective increase in the natural vibratory frequency of shields 5, 6, this increase in frequency taking place in all of the modes of vibration measured.

The natural frequency of the assembly is found to increase asymptotically with the number of pairs of braces 15, 16 which are used. No further substantial benefit was observed in increasing the number of X-braces beyond 32 pairs. For example, in the $f_{0,0}$ mode, the natural frequency was raised from approximately 50 c.p.s. with no braces to 120 c.p.s. with eight braces, with the rate of increase in frequency gradually diminishing asymptotically to a value on the order of 160 c.p.s. with 32 pairs of braces.

Similar results were obtained in the other modes of vibration. For example, the natural frequency was raised from 90 c.p.s. in the $f_{1,0-}$ mode depicted in FIG. 5 (with no braces) to 180 c.p.s. in this mode (with 32 braces).

Of particular interest is the optimum location of the point of attachment of the brace members to the radially inner portion of the disk. Although it would be expected that the braces would be most effective if attached to the disk at the point of the greatest amplitude of vibration, in order to positively restrain these points, it was discovered that the most effective location of the point of attachment was actually along the node of a higher frequency mode of vibration (such as the nodal circle 29 shown in FIG. 4). It is understood that a nodal circle will lie at almost any diameter for extremely high frequencies, but for the purpose of this discussion, "higher" means only slightly higher frequencies than the desired final assembly frequency. The frequencies given in this example will illustrate the general magnitude.

FIG. 2 illustrates the point of attachment of rods 15 to inner air shield 6 lying along circle 19, which was previously determined by calculation or by suitable laboratory tests to be a nodal circle. On an inner air shield having an outer diameter of approximately 50 inches and an inner diameter of approximately 26 inches, the nodal circle for the $f_{0,1}$ mode with a frequency of 244 c.p.s. lies at a diameter of approximately 30 inches. The frequency of this mode is thus slightly higher than the final lowest frequency achieved for the assembly of 208 c.p.s.

Points of attachment for braces 15 were tested at various diameters and for lower frequency modes. The natural frequency of the assembly reached a maximum when the braces 15 were attached near the nodal circle 19, whereas the natural frequency decreased when braces 15 were attached either radially inward or radially outward of nodal circle 19. This phenomenon was prevalent in the lower frequency modes. For example, in the $f_{0,0}$ mode the natural frequency was plotted against the diameter of points of attachment of the braces 16 to the outer air shield 5, which outer air shield had an outside diameter of approximately 54 inches and an inside diameter of approximately 14 inches. In the $f_{0,0}$ mode the natural frequency increased from 125 c.p.s. at a 14 inch diameter to a maximum of approximately 153 c.p.s. at a 29 inch diameter and then decreased to 130 c.p.s. at a 34 inch diameter. Similarly, in the $f_{1,0-}$ mode the natural frequency increased from a value of 125 c.p.s. at a 14 inch diameter to a maximum of 170 c.p.s. at a 30 inch diameter and then decreased to 160 c.p.s. at a 34 inch diameter. It may particularly be noted that the frequency of the disk having nodal circle 19 was higher than the frequencies sought to be removed. It is thus considered that a definite relationship exists between the natural frequency and the nearness of a point of attachment to a higher frequency nodal circle. Although the general configuration of the bracing arrangement shown greatly aids in raising the natural frequency of shields 5, 6, the particularity with which the location for the point of attachment of the braces is selected greatly enhances the effectiveness of the bracing members. For example, where the spacing between disks is fixed, changing the point of attachment of the inner ends of the braces will also shorten or lengthen the braces and change their "lines of action." Hence in some cases, the location on a nodal circle must be modified somewhat.

An appreciable increase in natural frequency of the outer air shield alone was achieved by constructing air shield 5 of graduated thicknesses as illustrated by the different portions 12, 13, 14. This had the salutary effect of raising the natural frequency of outer air shield 5 with the above-described dimensions from 165 c.p.s. in the $f_{0,0}$ or lowest mode to 218 c.p.s. This increase was independent of the increase obtained with the bracing members 15, 16.

The foregoing features result in a greatly improved air shield. For purposes of comparison, the following table of results illustrates the effectiveness of the final arrangement as compared to a conventional arrangement. The results for the $f_{0,1}$ mode are not given. They generally represent higher frequencies and hence are of no concern since the purpose of the structure is to remove only the undesirable low frequencies of vibration which lie close to the "forcing" frequencies.

|  | Conventional outside shield | Final outside shield | Conventional inside shield | Final inside shield |
| --- | --- | --- | --- | --- |
| O.D.″ | 53¾ | 53¾ | 50 | 50 |
| I.D.″ | 14 | 14 | 26¼ | 26¼ |
| Thickness | ⅜ | ⅝, ⅜, ⅛ | ⅜ | ⅜ |
| Natural frequency (c.p.s.) in mode: |  |  |  |  |
| $f_{0,0}$ | 48.5 | (¹) | 118 | 256 |
| $f_{1,0-}$ | 91 | 208 | 141 | 208 |
| $f_{1,0+}$ | 101.4 | 229 | 149 | 229 |
| $f_{2,0-}$ | 156.5 | 273 | (¹) | 273 |
| $f_{2,0+}$ | 164 | 282 | 205 | 282 |

¹ Not found.

The substantial increase in natural frequencies in the various vibration modes will be apparent.

In conclusion, it will be appreciated that the foregoing bracing arrangement is applicable to other types of duct structures where it is desired to raise the natural frequency of the structure without impeding a flow of fluid therethrough to a substantial degree. The arrangement is particularly applicable to a radial flow between two spaced disk-like radial walls such as the air shields described, where the inner edges of the members are unsupported and where other bracing methods would either interfere with some inner structure such as the rotor in the example shown or would impede the flow of fluid between the radial walls, although the principle would also apply to spaced walls of other shapes, i.e. rectangular walls. The fact that the bracing members 15, 16 can be made relatively slender, have rounded surfaces, and are placed diagonally to offer the least resistance to air flow, greatly enhances the usefulness of the structure.

The increase in effectiveness of the arrangement, which is obtained by locating the points of attachment of the columnar members to the radial walls along a nodal line of a higher frequency mode than that sought to be removed is a particular aspect of the invention which is least to be expected from a superficial analysis. The construction of one or more of the radial walls in graduated thicknesses varying from a greater thickness at the supported portion to a lesser thickness at the unsupported portion will aid in raising the fundamental mode.

The air shield described has achieved a substantial increase of the natural frequencies in all modes so as to raise the natural frequency of the duct assembly above the 60 cycle shaft vibration or the 120 c.p.s. magnetic vibration which would otherwise give rise to annoying resonance of the air shield due to the nearness of the natural frequency of the parts with the "forcing" frequencies.

These and many other advantages will be apparent to those skilled in the art and while there has been described what is at present considered to be the preferred embodiment of the invention for application to a generator air shield, the principle of the invention may be applied to other similar devices without departing from the true spirit and scope of the invention. Hence, it is desired to cover in the appended claims all such modifications which are covered by the appended claims.

What I claim as new and desire to secure by Letters Patent of the United States is:

1. A rigid annular duct assembly with a high natural frequency of vibration for conducting a radial flow of coolant fluid to a rotary machine comprising casing means defining a radially directed cooling duct, first and second axially spaced coaxial annular disks connected at their outer peripheries to said casing means to define an annular duct therebetween connecting with said radial duct, each of said disks defining first and second central substantially circular openings for receiving a shaft member, a first group of relatively slender circumferentially spaced columnar members connecting circumferentially spaced points on an outer circle near the outer periphery of the first disk with circumferentially spaced points on an inner circle on the second disk, and a second group containing an equal number of relatively slender columnar members similarly disposed between an inner circle on the first disk and an outer circle near the outer perpihery of the second disk, the respective pairs of the first and second groups being disposed so as to form an X with each pair rigidly connected at the intersection, whereby the respective radially inner portions of the first and second disks are rigidly braced from the more rigid outer portions of the second and first disks respectively so as to increase the natural vibrational frequency of the disks.

2. A rigid annular duct assembly according to claim 1 where the thickness of the slender columnar members is approximately equal to the average axial thicknesses of the first and second disks and where the number of respective pairs of columnar members is at least on the order of sixteen pairs.

3. A rigid annular duct assembly with a high natural frequency of vibration for conducting a radial flow of coolant fluid to a rotary machine comprising casing means defining a radially directed cooling duct, first and second axially spaced coaxial circular disks connected at their outer peripheries to said casing means to define an annular duct therebetween connecting with said radial duct, each of said disks defining first and second central substantially circular openings for receiving a shaft member and at least one of said disks comprising at least two concentric sections of different axial thickness, the greater thickness portion being radially outward of the lesser thickness portion, a first group of relatively slender circumferentially spaced columnar members connecting circumferentially spaced points on an outer circle near the periphery of the first disk with circumferentially spaced points on an inner circle on the second disk, and a second group containing an equal number of relatively slender columnar members similarly disposed between an inner circle on the first disk and an outer circle near the outer periphery of the second disk, the respective pairs of the first and second groups being disposed so as to form an X with each pair rigidly connected at the intersection, whereby the respective radially inner portions of the first and second disks are rigidly braced from the more rigid outer portions of the second and first disks respectively so as to increase the natural vibrational frequency of the disks.

4. A rigid annular duct assembly according to claim 3 where the disk of varying thickness comprises three concentric sections and the ratio of thicknesses of the sections is in the proportions 1/3/5.

5. A rigid duct assembly with a high natural frequency of vibration for conducting a flow of fluid comprising first and second spaced wall portions, each of which has a rigidly supported end and an unsupported end, a first group of relatively slender columnar members connecting spaced points toward the unsupported end of the first wall member with spaced points adjacent the supported end of the second wall member, and a second group containing an equal number of relatively slender columnar members similarly disposed between the unsupported end of the second wall member and the supported end of the first wall member, the respective pairs of the first and second groups being disposed so as to form an X with each pair rigidly connected at the intersection, the points of attachment of at least one group of said columnar members also being disposed so that their points of attachment near the unsupported end of the corresponding wall member lie along a nodal line of the wall member when it is vibrating, whereby the first and second groups of columnar members will rigidly brace the unsupported ends of the first and second wall members to increase the natural vibrational frequency of the wall members.

6. A rigid duct assembly according to claim 5 where the nodal line on the wall member to which the columnar members are attached is the node of a mode of vibration with a frequency higher than the minimum natural frequency desired for the duct assembly.

7. A rigid annular duct assembly with a high natural frequency of vibration for conducting a radial flow of coolant fluid to a rotary machine comprising casing means defining a radially directed cooling duct, first and second axially spaced coaxial annular disks connected at their outer peripheries to said casing means to define an annular duct therebetween connecting with said radial duct, each of said disks defining first and second central substantially circular openings for receiving a shaft member, a first group of relatively slender circumferentially spaced columnar members connecting circumferentially spaced points on an outer circle near the periphery of the first disk with circumferentially spaced points on an inner circle on the second disk, said inner circle on the second disk lying on a nodal circle of the second disk when it is vibrating alone at a frequency higher than that desired for the duct assembly, and a second group containing an equal number of relatively slender columnar members similarly disposed between an inner circle on the first disk and an outer circle near the periphery of the second disk, the respective pairs of the first and second groups being disposed so as to form an X with each pair rigidly connected at the intersection, whereby the respective radially inner portions of the first and second disks are rigidly braced from the more rigid outer portions of the second and first disks respectively so as to increase the natural vibrational frequency of the duct assembly.

8. A rigid annular duct assembly with a high natural frequency of vibration for conducting a radial flow of coolant fluid to a rotary machine comprising casing means defining a radially directed cooling duct, first and second axially spaced coaxial annular disks connected at their outer peripheries to said casing means to define an annular duct therebetween connecting with said radial duct, each of said disks defining first and second central substantially circular openings for receiving a shaft member and at least one of said disks comprising concentric sections of different axial thickness, the greater thickness section being outward from the lesser thickness section, a first group of relatively slender circumferentially spaced columnar members connecting circumferentially spaced points on an outer circle near the periphery of the first disk with circumferentially spaced points on an inner circle on the second disk, said inner circle of the second disk lying on a nodal circle of the second disk when it is vibrating alone at a frequency higher than that desired for the duct assembly, and a second group containing an equal number of relatively slender columnar members similarly disposed between an inner circle on the first disk and an outer circle near the outer periphery of the second disk, the respective pairs of the first and second groups being disposed so as to form an X with each pair rigidly connected at the intersection, whereby the respective radially inner portions of the first and second disks are rigidly braced from the more rigid outer portions of the second and first disks respectively so as to increase the natural vibrational frequency of the disks.

No references cited.